United States Patent [19]
Chapman

[11] 3,937,516
[45] Feb. 10, 1976

[54] EXTENSION COMPARTMENT FOR MOTOR VEHICLE

[76] Inventor: Joe W. Chapman, 8364 Fairview Ridge Road, Lesage, W. Va. 25537

[22] Filed: Nov. 16, 1973

[21] Appl. No.: 416,459

[52] U.S. Cl. ............... 296/26; 49/465; 296/23 MC
[51] Int. Cl.² ......................................... B62C 1/06
[58] Field of Search .... 296/26, 23 MC, 23 R, 35 A, 296/27, 103, 23 C; 49/465; 160/369

[56] References Cited
UNITED STATES PATENTS

| | | | |
|---|---|---|---|
| 1,321,389 | 11/1919 | Paradis et al. | 296/103 |
| 3,241,547 | 3/1966 | Hirsch | 49/463 |
| 3,420,566 | 1/1969 | Obra | 296/23 MC |
| 3,494,655 | 2/1970 | Linton | 296/23 C |
| 3,730,580 | 5/1973 | Page | 296/26 |

*Primary Examiner*—Robert J. Spar
*Assistant Examiner*—Gary Auton
*Attorney, Agent, or Firm*—LeBlanc & Shur

[57] ABSTRACT

An open ended extension compartment is fitted to the rear end of a vehicle having a rear door frame by first releasably securing a rigid mounting ring in the vehicle door frame and then securing the periphery of the open end of the compartment to the mounting ring. The vehicle door remains hinged to the vehicle and may be employed as an access door for the interior of the compartment.

13 Claims, 9 Drawing Figures

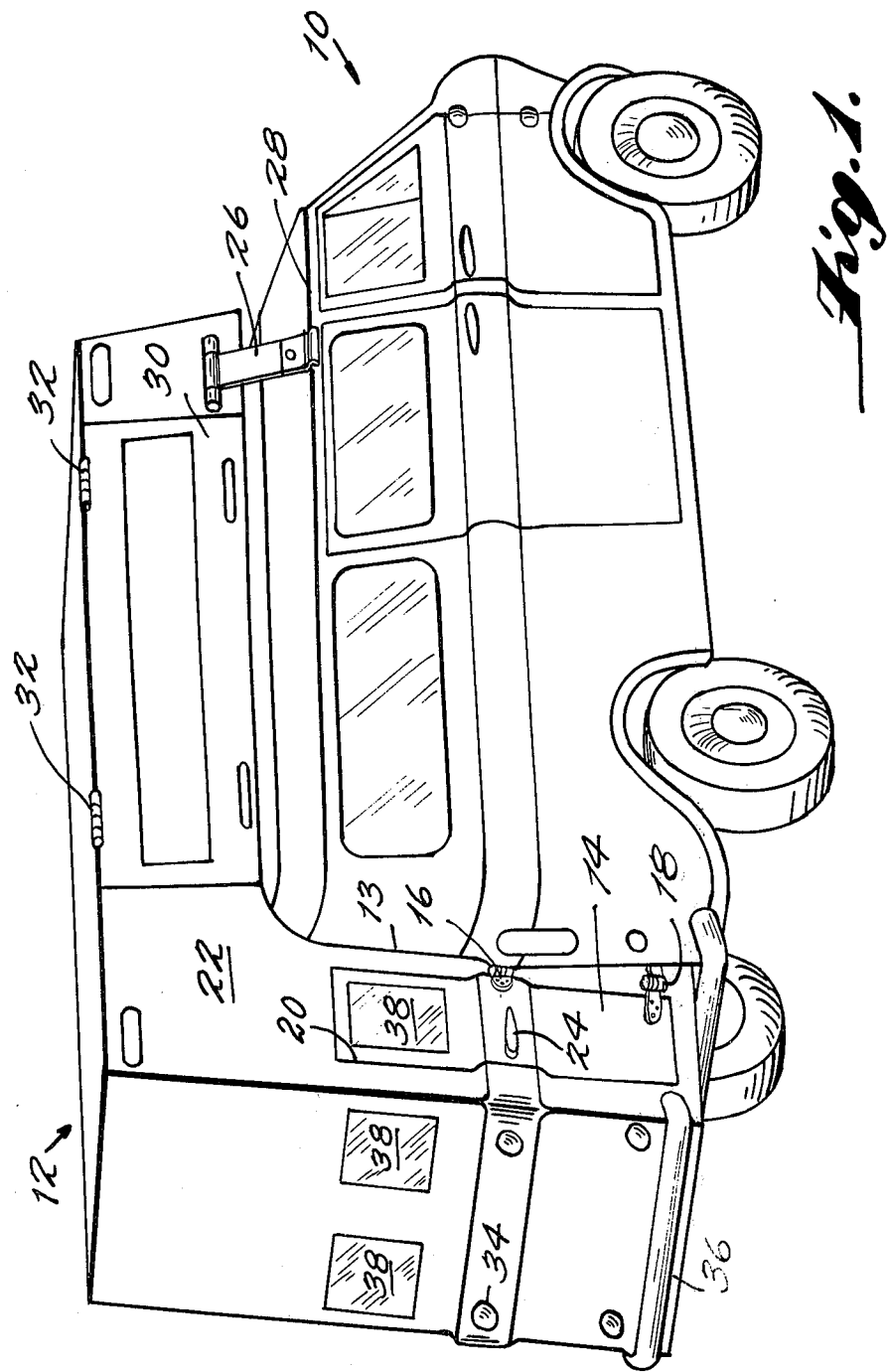

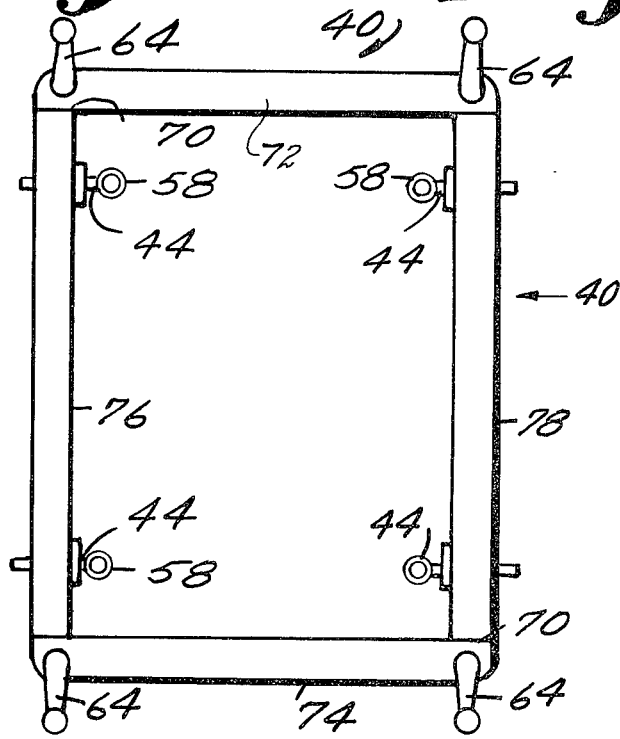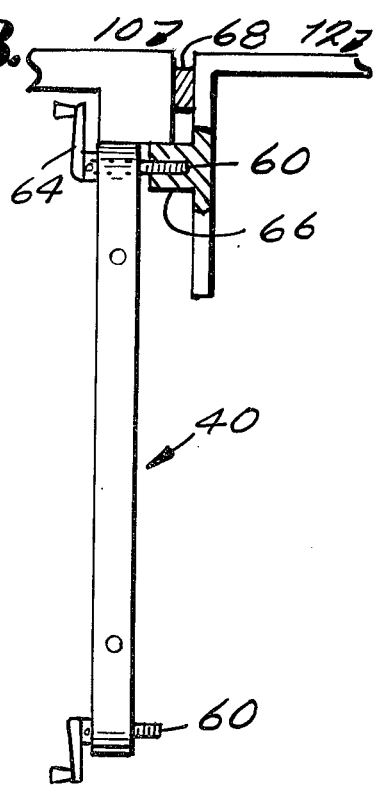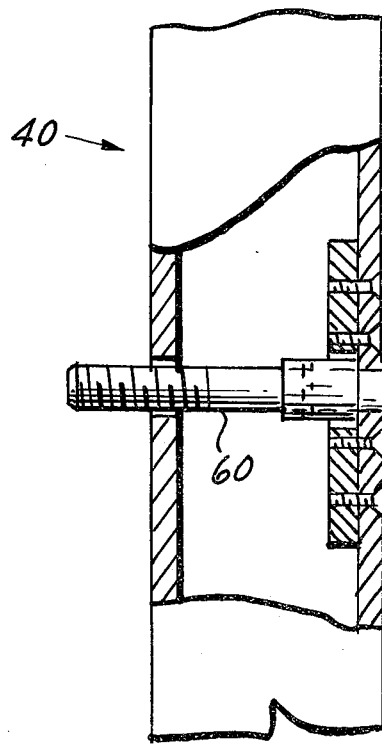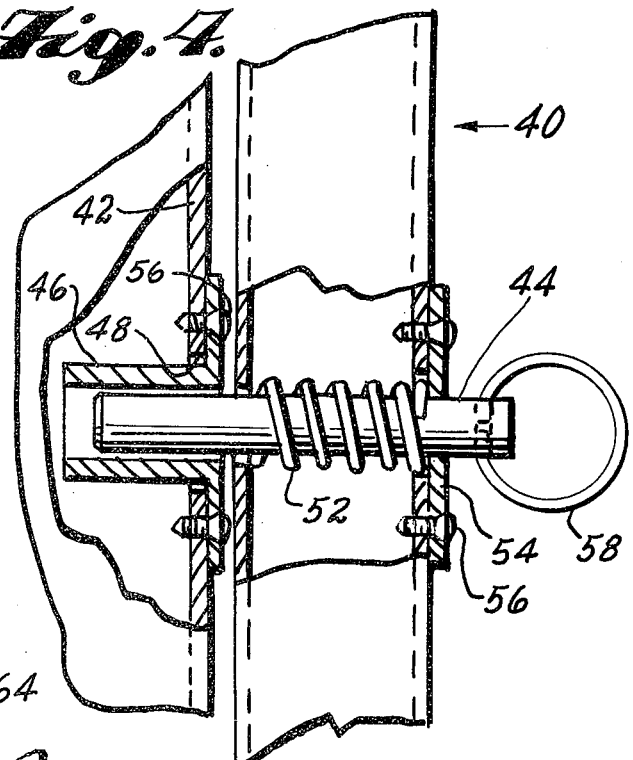

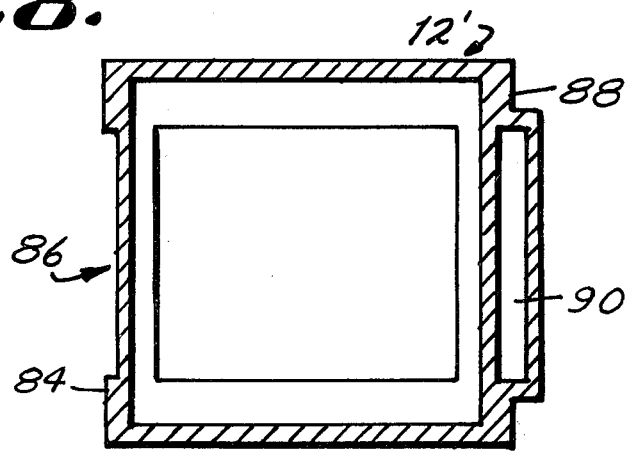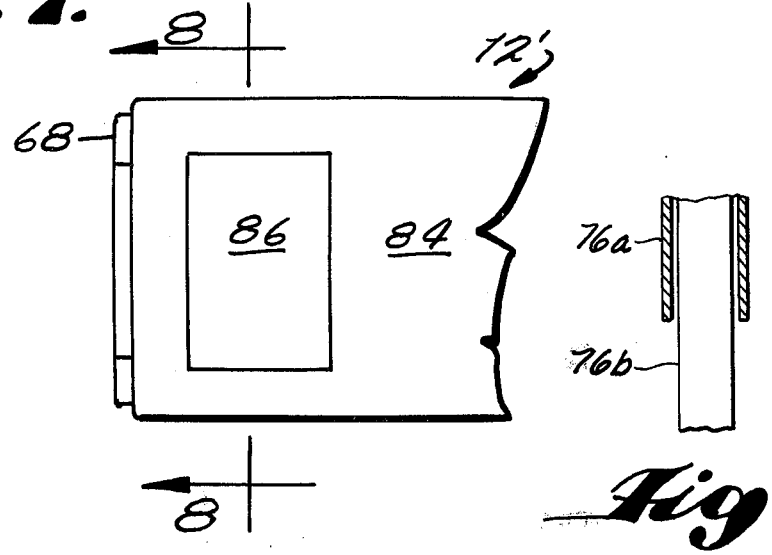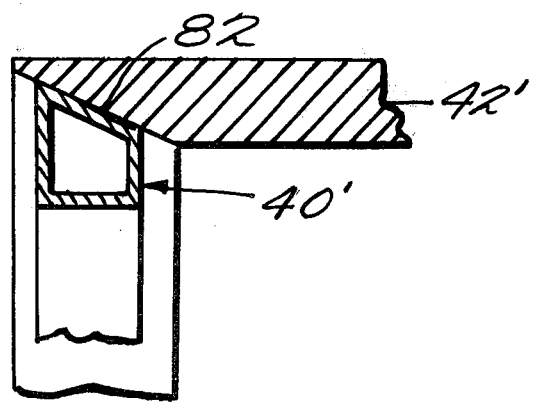

EXTENSION COMPARTMENT FOR MOTOR VEHICLE

This invention relates to detachable motor vehicle extension compartments for vans and similar vehicles and to methods and apparatus for mounting the compartments on the vehicle.

It is known to provide detachable extension compartments on pick-up trucks for the purpose of enclosing the otherwise open body of the truck and to provide detachable carriers on the tops of various vehicles, including vans and recreational vehicles. It is also known to extend the useable interior space of a vehicle body with various knock-down extensions usually constructed of flexible fabric in order that the extension may be folded into a non-use position.

The present invention contemplates a quite different system in which a body extension is fitted to the frame of a doorway in a vehicle in a special way requiring only a simple modification of the door frame which does not interfere with the normal function of the door or doors when the body extension is not in place. The system has its primary utility in providing additional interior space at the rear end of a van or other vehicle having a door or doors which swing about a generally vertical hinge axis, although the principles of the system may be applied to any vehicle door frame.

The mounting arrangement includes a rigid mounting structure, usually in the shape of a complete or partial ring or picture-frame, which is detachably secured to the inner surfaces of the door frame after the door or doors have been fully opened. The mounting structure carries a coupling assembly which is attachable to the open end portion of the extension compartment in a manner to pull the latter horizontally into tight engagement with the vehicle body or with the mounting structure or with both.

Ordinary the vehicle door is not removed from the vehicle when the extension compartment is attached, and in one embodiment of the present invention the vehicle door is employed as a side door for the compartment. In this embodiment the compartment is manufactured with a side door frame adjacent the open end of the compartment. The vehicle door closes and opens this door frame when swinging between approximately 180° and 90° from its original closed position.

Alternatively the vehicle door may fit into a blind door frame in the exterior of the extension compartment or into a slot extending into the side wall of the compartment in a direction parallel to the longitudinal axis of the vehicle.

In a further embodiment the door or doors of the vehicle may be removed before mounting the extension compartment although this arrangement is not as convenient for the vehicle owner because it requires not only the work of detaching the doors but also the necessity of storing the doors when not in use.

The compartment may be fitted interiorly with any desired equipment so as to serve, for example, as a kitchen or lavatory or dog kennel. Alternatively the compartment may merely be employed as additional space for storage.

The invention will be further understood from the following more detailed description of several embodiments of the invention, taken with the drawings in which:

FIG. 1 is a perspective view of a van having mounted thereon a rearwardly projecting extension compartment embodying the principles of the invention;

FIG. 2 is a schematic end view of a mounting ring embodying the principles of the invention;

FIG. 3 is a schematic side view of the mounting ring shown in FIG. 2;

FIG. 4 is a fragmentary view on an enlarged scale of a portion of FIG. 2;

FIG. 5 is a fragmentary view on an enlarged scale of a portion of FIG. 3;

FIG. 6 is a schematic fragmentary view illustrating a modified form of mounting ring;

FIG. 7 is a schematic side elevational view of a modified form of extension compartment;

FIG. 8 is a sectional view taken on the line 8 — 8 of FIG. 7; and

FIG. 9 is an enlarged cross-sectional view of a portion of the mounting frame illustrating part of the telescoping section thereof.

FIG. 1 illustrates a typical motor van 10 of conventional construction fitted with an extension compartment 12 constructed according to the present invention. The van includes two rear doors each of which swings outwardly about a generally vertical axis located laterally of the longitudinal axis of the van 10. The right hand door is illustrated at 14 as being supported from the body of the van by upper and lower hinges 16 and 18.

The extension compartment 12 includes a rear box-like portion having an open forward end 13 which fits against the rear of the vehicle body so that the vehicle door frame provides communication between the interior of the box-like portion and the interior of the vehicle. The rear door 14 of the vehicle is shown as being in an approximately 90° open position with respect to the vehicle door frame, and in this position it resides within a door frame 20 in a side wall 22 of the compartment 12 so as to provide access from outside. The door 14 includes a conventional handle and door latch assembly 24 which cooperates with complementary features in the compartment door frame 20 so as to releasably latch the door 14 in a closed position in a conventional manner. Opening of the door 14 relative to the compartment 12 is effected by swinging the door 14 about the hinges 16 and 18 to, for example, a position about 180° open with respect to the vehicle door frame.

In the illustrated embodiment the compartment 12 also includes a forwardly extending hollow portion which rests on top of the vehicle. A strap 26 releasably secured to a gutter 28 on the vehicle may be employed to hold this portion of the compartment in place. Access may be by way of a door 30 hinged at 32 for swinging movement about a generally horizontal axis. The rear of the compartment 12 may be provided with conventional features such as brake lights 34 and a bumper 36. Windows 38 may be provided where desired.

The compartment 12 is releasably secured to the rear end of the vehicle by means of a mounting ring 40 illustrated schematically in FIGS. 2 and 3. The mounting ring 40 is a rigid annular structure which is releasably secured in the door frame of the vehicle and which in the illustrated embodiment is also releasably secured to the compartment 12. In some constructions it may be desirable for the mounting ring 40 to be a permanent part of the compartment 12, but in either event the connection between the ring 40 and the compartment 12 must provide for slight relative movement between the two structures in a direction generally parallel to the axes of the openings in the ring 40 and in the forward end of the compartment 12.

As shown in FIGS. 2 and 4 one means for releasably connecting the mounting ring 40 to a vehicle door frame 42 includes a plurality of spring-loaded latch pins 44 carried by the ring 40 and insertable into bushings 46 provided in the door frame 42. The bushings 46 may be mounted by first drilling holes 48 of appropriate size in the door frame 42, inserting the bushings 46 in the holes 48 and permanently securing the bushings to the frame 42 with screws 50. Each latch pin 44 resides in a hole in the mounting ring 40 and is normally biased by a spiral spring 52 into the extended position shown in FIG. 4 so that its outer end projects into its respective bushing 46. In the illustrated embodiment the outer end of the spring 52 is secured in a radial hole in the latch pin 44 and the inner end bears against a plate 54 which is secured to the ring 40 by screws 56. Manual retraction of a pin 44 is effected by grasping and pulling a pull ring 58 attached to the inner end of the pin 44. Any conventional locking feature (not shown) may be provided for releasably holding the pin 44 in a retracted position.

A suitable connection between the mounting ring 40 and the extension compartment 12 is illustrated in FIGS. 3 and 5. As shown, the connection includes a plurality of rotatable studs 60 each journalled at 62 in a hole in the ring 40. The studs 60 are generally parallel to the axis of the opening in the ring 40 and project from the ring 40 in a rearward direction with respect to the vehicle 10, that is in a direction toward the extension compartment 12. The forward end of each stud 60 is provided with a crank handle 64 which is accessible from the interior of the vehicle 10 when the mounting ring 40 is latched in the vehicle door frame 42 by the latch pins 44. The outer end of each stud 60 is adapted to threadedly engage a tapped hole in a boss 66 on the forward end of the compartment 12. Upon rotation of the studs 60 by means of the cranks 64 the compartment 12 is drawn to the left as viewed in FIG. 3 so that the open end of the compartment 12 tightly engages the rear end of the vehicle 10. An annular resilient gasket 68 may be provided between the compartment 12 and the vehicle 10.

The mounting ring 40 may be constructed in any suitable manner so long as it possesses the strength and rigidity to support the compartment. In the illustrated embodiment the ring 40 is constructed of four metal box members 72, 74, 76, 78 welded at 70. If desired each box member may be in the form of telescopic inner and outer box members so as to provide for adjustment of the vertical and horizontal dimensions of the ring 40. For example, the vertical members 76 and 78 may each be formed in two telescoping sections 76a and 76b as illustrated in FIG. 9. The horizontal members 72 and 74 may be formed similarly.

FIG. 6 illustrates a mounting ring 40' having an outer face contoured so as to be compatible with differences between the shape of the ring 40 and a vehicle door frame 42$^1$. Some vehicle door frames are bevelled as shown at 82 in FIG. 6.

In the preferred embodiment direct access to the compartment 12 from outside is provided by a side doorway which can be closed by one of the doors of the vehicle 10, as shown at 14 in FIG. 1. If it is not desired to have access to the compartment through the rear doorway of the vehicle 10, the side walls of the compartment may be provided with retaining means for holding the rear doors of the vehicle in a 90° open position. FIGS. 7 and 8 illustrate a modified compartment 12$^1$ having one side wall 84 fitted with a dummy door frame 86 for receiving a vehicle rear door and the opposite side wall 88 fitted with a slot 90 for receiving the other vehicle rear door.

The procedure for mounting the compartment 12 or 12$^1$ on a vehicle 10 has been generally described above. First, the rear doors of the vehicle 10 are opened but not removed. It may be necessary to remove or modify the door stop devices, if present, so as to permit opening to about 180° from the closed position. Then the mounting ring 40, with the latching pins 44 in their retracted positions, is inserted into the vehicle door frame following which the pins 44 are released so as to move outwardly into the bushings 46 in the door frame. The bushings 46 will have been installed previously, and they do not interfere with the normal operation of the rear doors. Next the compartment 12 is raised to the proper elevation and moved horizontally toward the rear end of the vehicle 10 in a direction along the longitudinal axis of the vehicle 10 until the threaded ends of the studs 6 engage the bosses 66 on the open end of the compartment. An operator inside the vehicle rotates the studs 60 by means of the cranks 64 thereby pulling the open end of the compartment 10 into tight engagement with the rear of the vehicle.

What is claimed is:

1. For a wheeled vehicle having a door frame, a forwardly opening enclosure including a pair of spaced side walls, a top wall and a bottom wall, and means for releasably securing said enclosure to the vehicle with its forward open end opening into the vehicle through its door frame including a generally rectangular mounting frame having top, bottom and spaced side members connected one to the other, and means for releasably securing said mounting frame to the door frame with the mounting frame disposed substantially concentrically within the vehicle door frame and with the sides, top and bottom frame members adjacent corresponding margins of the door frame, a seal for sealing between said enclosure and the vehicle when the enclosure is secured to the vehicle, means carried by said frame and said enclosure for releasably securing said enclosure and said frame one to the other including cooperating fastening elements carried by said frame and said enclosure for displacing said enclosure toward said vehicle with the seal between said enclosure and the vehicle thereby sealing the enclosure to the vehicle, one of the side walls of said enclosure including a door frame adjacent the open end thereof, said enclosure being located relative to the vehicle such that the enclosure door frame receives a door of the vehicle when the vehicle door is opened to extend substantially parallel to and in substantially coplanar relationship with said one side wall.

2. Apparatus according to claim 1 wherein said releasing means for securing said frame to the vehicle include a plurality of elements carried by said frame movable in the plane containing said frame into and out of securement with the door frame.

3. Apparatus according to claim 2 wherein said elements comprise pins having end portions which project laterally and externally of said frame for engagement in corresponding openings formed in the vehicle door frame, said pins being mounted for movement in said plane for withdrawal of the projecting end portions thereof to a location substantially flush with the outer margins of said frame.

4. Apparatus according to claim 3 wherein said pins are spring biased for movement into their extended positions, and means carried by said pins for withdrawing the end portions thereof from engagement with the vehicle frame and against the bias of said spring.

5. Apparatus according to claim 4 wherein said cooperating elements include a screw carried by one of said frame and said enclosure and a threaded boss carried by the other of said frame and said enclosure, and means including a handle for rotating said screw when threadedly engaged with said boss for displacing said enclosure toward the vehicle.

6. Apparatus according to claim 1 wherein said cooperating elements include a screw carried by one of said frame and said enclosure and a threaded boss carried by the other of said frame and said enclosure, and means including a handle for rotating said screw when threadedly engaged with said boss for displacing said enclosure toward the vehicle.

7. Apparatus according to claim 1 wherein each of said side, top and bottom frame members is comprised of two sections with one section telescopically receivable in the other section whereby the horizontal and vertical dimensions of the frame are adjustable to accommodate the frame to different vehicle frame sizes.

8. Apparatus according to claim 1 wherein one of the side walls of said enclosure includes a slot having an open end opening toward the vehicle for receiving a door of the vehicle when the vehicle door is pivoted to lie substantially parallel to the one side wall.

9. For a wheeled vehicle having a door frame, a forwardly opening enclosure including a pair of spaced side walls, a top wall, and a bottom wall, and means for releasably securing said enclosure to the vehicle with its forward open end opening into the vehicle through its door frame including a generally rectangular mounting frame having top, bottom and spaced side members connected one to the other, and means for releasably securing said mounting frame to the door frame with the frame disposed substantially concentrically within the vehicle door frame and with the sides, top and bottom frame members adjacent the corresponding margins of the door frame, said means for releasably securing said frame to the vehicle including a plurality of elements carried by said frame and movable in the plane containing said frame into and out of securement with the vehicle door frame, and means carried by said frame and said enclosure for releasably securing said enclosure and said frame one to the other, one of the side walls of said enclosure including a door frame adjacent the open end thereof, said enclosure being located relative to the vehicle such that the enclosure door frame receives a door of the vehicle when the vehicle door is opened to extend substantially parallel to and in substantially coplanar relationship with said one side wall.

10. Apparatus according to claim 9 wherein said elements comprise pins having end portions which project laterally and externally of said frame for engagement in corresponding openings formed in the vehicle frame, said pins being mounted for movement in said plane for withdrawal of the projecting end portions thereof to a location substantially flush with the outer margins of said frame.

11. Apparatus according to claim 10 wherein said pins are spring biased for movement into their extended positions, and means carried by said pins for withdrawing the end portions thereof from engagement with the vehicle frame and against the bias of said spring.

12. Apparatus according to claim 10 wherein each of said side, top and bottom frame members is comprised of two sections with one section telescopically receivable in the other section whereby the horizontal and vertical dimensions of the frame are adjustable to accommodate the frame to different vehicle frame sizes.

13. Apparatus according to claim 10 wherein one of the side walls of said enclosure includes a slot having an open end opening toward the vehicle for receiving a door of the vehicle when the vehicle door is pivoted to lie substantially parallel to the one side wall.

* * * * *